United States Patent
Ono et al.

(10) Patent No.: US 8,698,343 B2
(45) Date of Patent: Apr. 15, 2014

(54) STATIONARY EQUIPMENT

(75) Inventors: Junji Ono, Shibata (JP); Hideharu Ohama, Murakami (JP); Toshiki Shirahata, Shibata (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 237 days.

(21) Appl. No.: 13/372,127

(22) Filed: Feb. 13, 2012

(65) Prior Publication Data

US 2012/0326446 A1    Dec. 27, 2012

(30) Foreign Application Priority Data

Jun. 22, 2011  (JP) .................................. 2011-138162
Dec. 26, 2011  (JP) .................................. 2011-283336

(51) Int. Cl.
*F03D 9/00*    (2006.01)

(52) U.S. Cl.
USPC .......................................................... 290/55

(58) Field of Classification Search
USPC .......................... 290/53, 55, 44; 416/244 R, 9
See application file for complete search history.

(56) References Cited

U.S. PATENT DOCUMENTS

| | | | |
|---|---|---|---|
| 6,327,994 B1 * | 12/2001 | Labrador | 114/382 |
| 6,689,507 B1 * | 2/2004 | Tsutsumi et al. | 429/67 |
| 7,753,644 B2 * | 7/2010 | Krippene | 415/4.2 |
| 8,403,623 B2 * | 3/2013 | Krippene | 415/4.2 |
| 8,459,930 B2 * | 6/2013 | Krippene | 415/4.2 |
| 8,544,575 B1 * | 10/2013 | Scaringe et al. | 180/65.22 |
| 2009/0302611 A1 * | 12/2009 | Masters et al. | 290/53 |

FOREIGN PATENT DOCUMENTS

| | | |
|---|---|---|
| JP | 59-104109 | 6/1984 |
| JP | 2011-069363 | 4/2011 |

* cited by examiner

*Primary Examiner* — Jean F Duverne
(74) *Attorney, Agent, or Firm* — McDermott Will & Emery LLP (57) ABSTRACT

The present invention aims to provide a stationary equipment installed in a sealed space on a space-saving basis and having a favorable cooling efficiency. The stationary equipment includes an equipment main body containing an iron core, a coil and insulating oil, a hollow pipe connected to the equipment main body to circulate the insulating oil in it and a plurality of hollow corrugated fins disposed on the pipe. The pipe and the corrugated fins are covered with a hood, a duct is connected to the hood and the duct is connected to an elongated cylindrical member vertically disposed on an inner wall of the tower to increase airflow by stack effect to increase a cooling efficiency in a wind power generation device.

6 Claims, 12 Drawing Sheets

STATIONARY EQUIPMENT

CLAIM OF PRIORITY

The present application claims priority from Japanese Patent Application JP 2011-138162, filed on Jun. 22, 2011, and Japanese Patent Application JP 2011-283336, filed on Dec. 26, 2011, the content of which is hereby incorporated by reference into this application.

BACKGROUND

1. Technical Field

The present invention relates to a structure for efficiently cooling stationary equipment installed in a sealed space as in a wind power generation device that generates power using a windmill that converts wind which is natural energy to a turning force.

2. Description of the Related Art

Wind power is thought to be one type of most clean and environment-friendly energy which is currently available and wind power generation has come to more and more attract notice.

In general, a wind power generation device is configured to rotate a windmill disposed on the top of a tower and convert rotational energy obtained to electric energy to be used. A controller, a converter and a transformer constituting a PCS (Power Control System) are disposed on the lower side in the tower.

Recently, heat generated from various devices causes problems as the performance of a windmill is improved and its size is increased. Therefore, a technique of making a vent in a lower wall surface of a tower and cooling the inside of the tower by a fan disposed in the vent is disclosed in order to cope with heat generation as described in Japanese Patent Application Laid-Open No. 2011-69363.

In addition, although it is not intended to be used for wind power generation, a technique of covering the surrounding of a radiator from above with a shield hood and cooling the radiator by a fan in a gas insulating transformer is disclosed in Japanese Patent Application Laid-Open No. Sho59 (1984)-104109.

SUMMARY

In general, in forced cooling of stationary equipment such as a transformer, it may be unavoidable to install a seat for attaching a cooling fan to the stationary equipment and hence external dimensions may be increased. In addition, a sufficient installation space may not be ensured in a sealed space as in wind power generation and a sufficient cooling efficiency may not be attained.

Further, since it may be unavoidable to suppress temperature rising in natural cooling, a design that a loss of a stationary equipment main body is reduced or a design that many cooling fans are attached is made. However, such a problem may occur that the stationary equipment main body is large-sized and hence does not fit in an installation space.

An object of the present invention is to provide a device for efficiently cooling stationary equipment used in a sealed space as in a wind power generation device on a space-saving basis.

In order to attain the above mentioned object, according to an embodiment of the present invention, in stationary equipment used in a wind power generation device including a windmill, a tower, a nacelle and a generator to convert DC power generated by the generator into AC power to step up and step down a voltage, the stationary equipment includes an equipment main body containing an iron core, a coil and insulating oil, a hollow pipe connected to the equipment main body to circulate the insulating oil in it and a plurality of hollow corrugated fins disposed on the pipe, wherein the pipe and the corrugated fins are covered with a hood, and a duct is connected to the hood and the duct is connected to an elongated cylindrical member vertically disposed on an inner wall of the tower.

In the stationary equipment, a fan is disposed in a duct connected to the hood.

In the stationary equipment, a plurality of the hollow pipes connected to the equipment main body are disposed, the plurality of hollow corrugated fins are disposed on each of the plurality of pipes, and all the pipes and corrugated fins are covered with the hood, or each of the pipes and corrugated fins is covered with the hood.

According to the present invention, since stationary equipment used in a wind power generation device is configured such that a hood is put on a corrugated fin or corrugated fins for cooling of the stationary equipment and a duct connected to the hood is connected to a cylindrical member disposed on an inner wall surface of a tower so as to exhaust warn air passing through the corrugated fin(s) for cooling of the stationary equipment through the cylindrical member, the air smoothly flows by tunnel effect to increase a cooling efficiency. In addition, it is allowed to form a cooling structure for the stationary equipment on a space-saving basis.

DETAILED DESCRIPTION OF THE PREFERRED EMBODIMENTS

Hereinafter, preferred embodiments of the present invention will be described with reference to the accompanying drawings.

Figure 1:
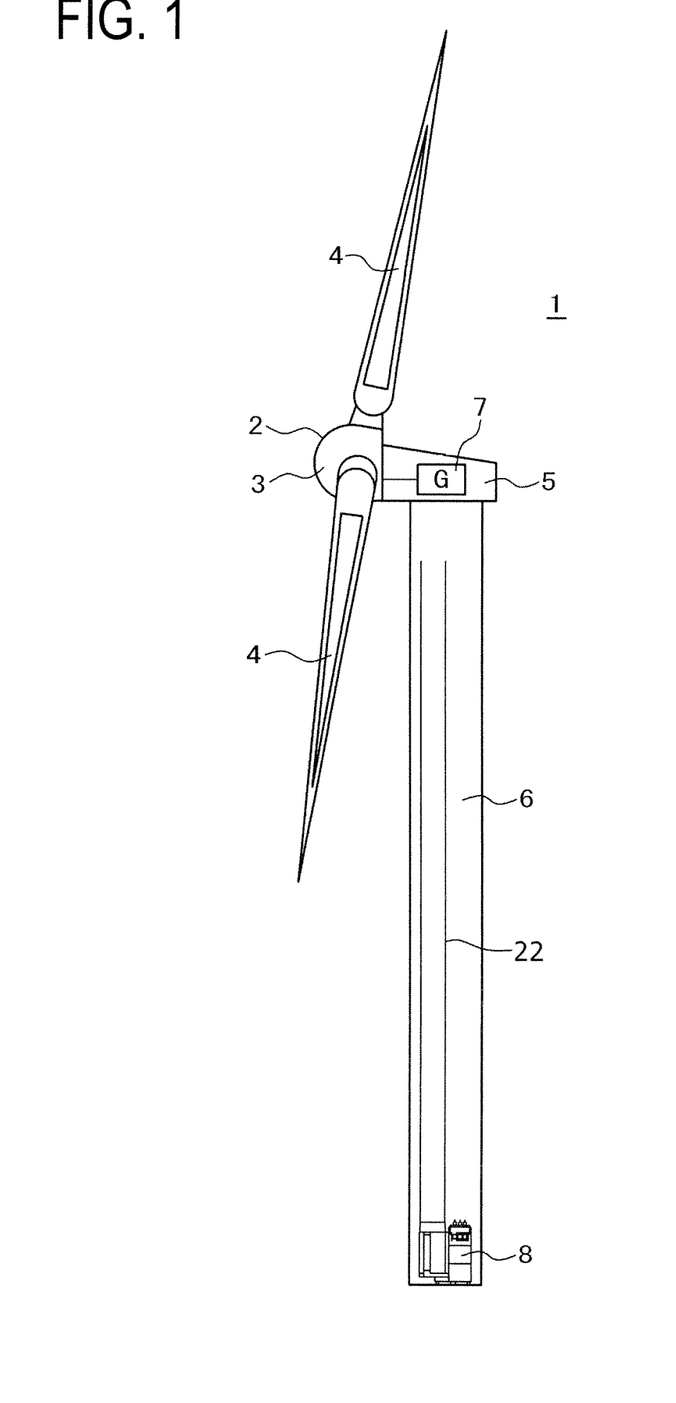
FIG. 1 is a schematic sectional diagram generally illustrating a wind power generation device.

FIG. 1 is a diagram generally illustrating a wind power generation device of the present invention.

In FIG. 1, 1 is a wind power generation device, 2 is a windmill, 3 is a propeller, 4 is a blade, 5 is a nacelle, 6 is a tower, 7 is a generator and 8 is stationary equipment.

In general, the wind power generation device 1 includes the base, the tower 6, the windmill 2 and a transformation switching facility. The base is fixed to the ground so as to prevent the windmill 2 and the tower from being collapsed by wind or an earthquake. The tower 6 has a structure which is almost cylindrical and the diameter of which is gradually reduced as it goes to the tip in many cases and is fixed upright to the base.

The windmill 2 is attached to the tip of the tower 6. The windmill 2 includes the nacelle 5, a not-illustrated rotor shaft, the propeller 3, a not-illustrated step-up gear and the generator 7.

The nacelle 5 is configured to be rotatable on the tip of the tower 6 as a shaft and to typically turn to the front relative to the direction of wind.

Three blades 4 are disposed on the propeller 3 at equal intervals and the propeller 3 is attached to the rotor shaft such that each blade 4 rotates by receiving wind from the front.

The step-up gear is connected to the rotor shaft and is configured by using a gear or the like so as to increase a rotational frequency of the rotor shaft to a predetermined rotational frequency.

The step-up gear is connected to the generator 7 to increase a rotating speed of the rotor shaft so as to convert rotational energy to electric energy by the generator 7.

The transformation switching facility is installed on the lower side in the tower 6. The stationary equipment 8 such as a transformer is illustrated in FIG. 1 as a representative of the transformation switching facility.

The stationary equipment 8 converts DC power (voltage) of the generator 7 to AC power (voltage) via a not-illustrated inverter, steps up and steps down the voltage and supplies it to the outside as the AC power.

Here, dimensions of the wind power generation device will be described.

The tower 6 has a height of 60 to 70 m, each blade 4 has a length of 40 m and hence the entire height of the device may be about 100 to 110 m. A lower side part of the tower 6 has a diameter of about 4 m.

Next, the inside of the tower will be described with reference to FIG. 2A and FIG. 2B.

Figure 2A:
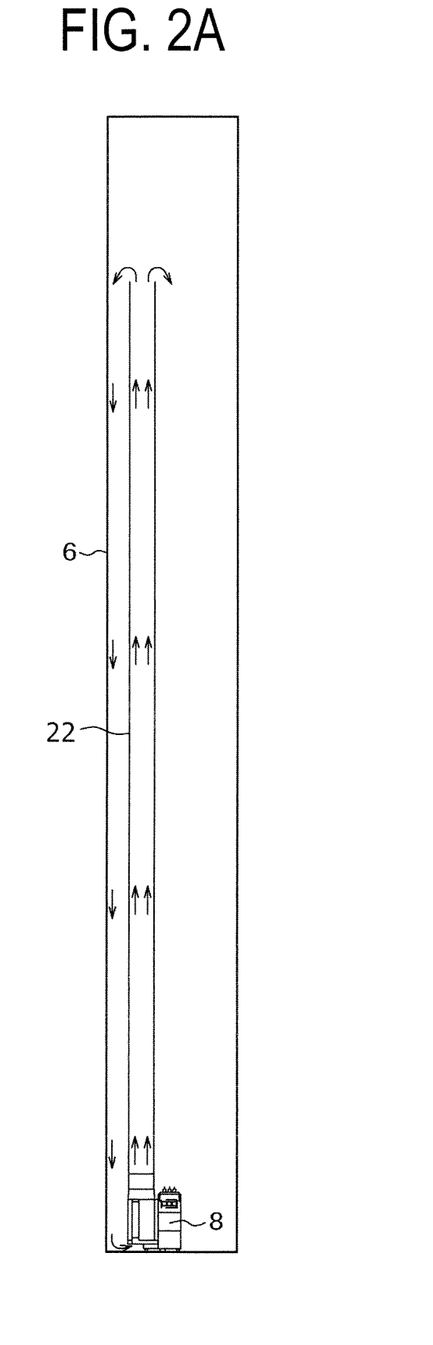
FIG. 2A is a side view illustrating the inside of a tower of a wind power generation device of the present invention.
Figure 2B:
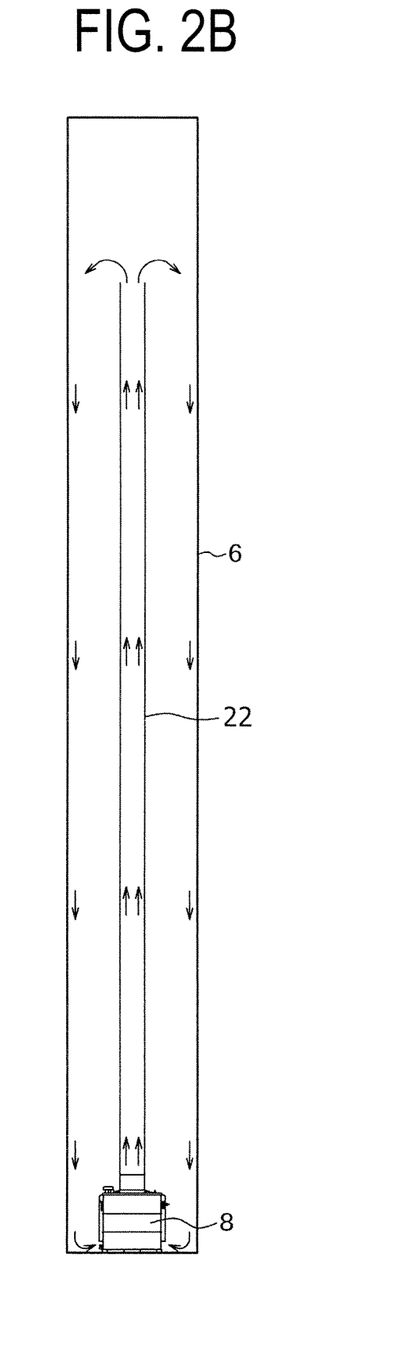
FIG. 2B is a front view illustrating the inside of the tower of the wind power generation device of the present invention.

FIG. 2A is a front view illustrating an inner lower part of the tower 6 and FIG. 2B is a side view thereof. In FIG. 2A and FIG. 2B, 6 is the tower, 8 is the stationary equipment and 22 is a circular and cylindrical member for guiding upward warm air that passes through corrugated fins for cooling of the stationary equipment 8.

Figure 4:
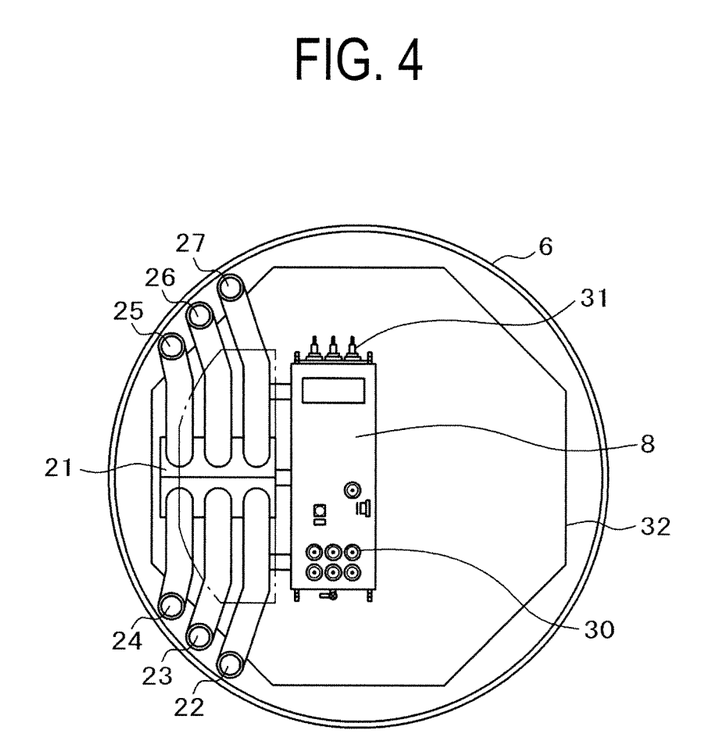
FIG. 4 illustrates a top view of the lower part in the tower of the present invention.

The cylindrical member 22 is disposed on a tower inner wall, has an elongated tubular form and is formed to be slightly shorter than the height of the tower 6. For example, the cylindrical member may have a height of about 60 m for the tower of about 70 m high. In addition, three cylindrical members may be disposed on each of two places as illustrated in FIG. 4 and the diameter of each member may be about 30 cm.

The warm air that goes up in the circular cylindrical member is gradually cooled and the air exhausted through the cylindrical member circulates in the tower such that it goes down along the inner wall surface and central part of the tower and then is again taken into the cylindrical member from the lower side of the stationary equipment.

Next, the stationary equipment of the present invention will be described.

Figure 3A:
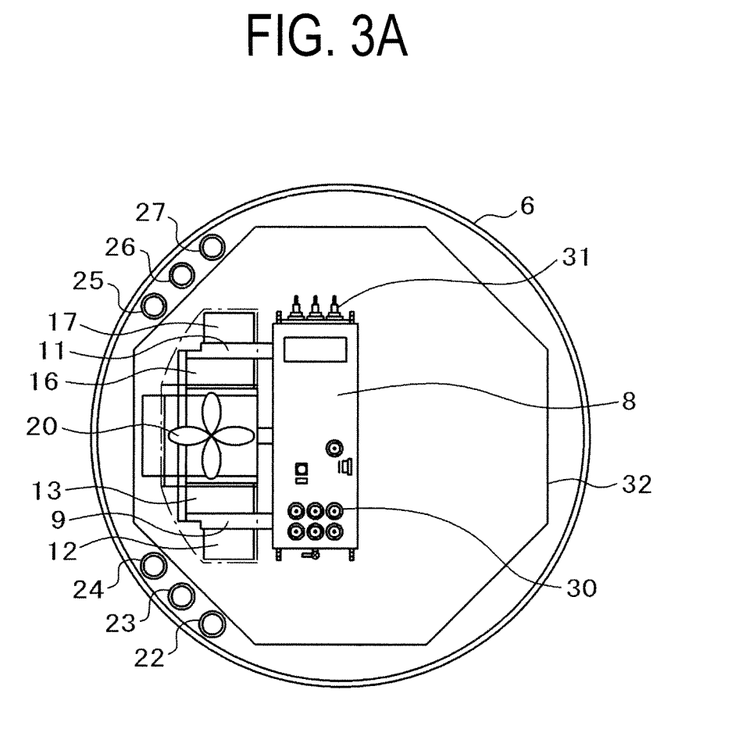
FIG. 3A illustrates a top view of a lower part in a tower where stationary equipment according to one embodiment of the present invention is installed.
Figure 3B:
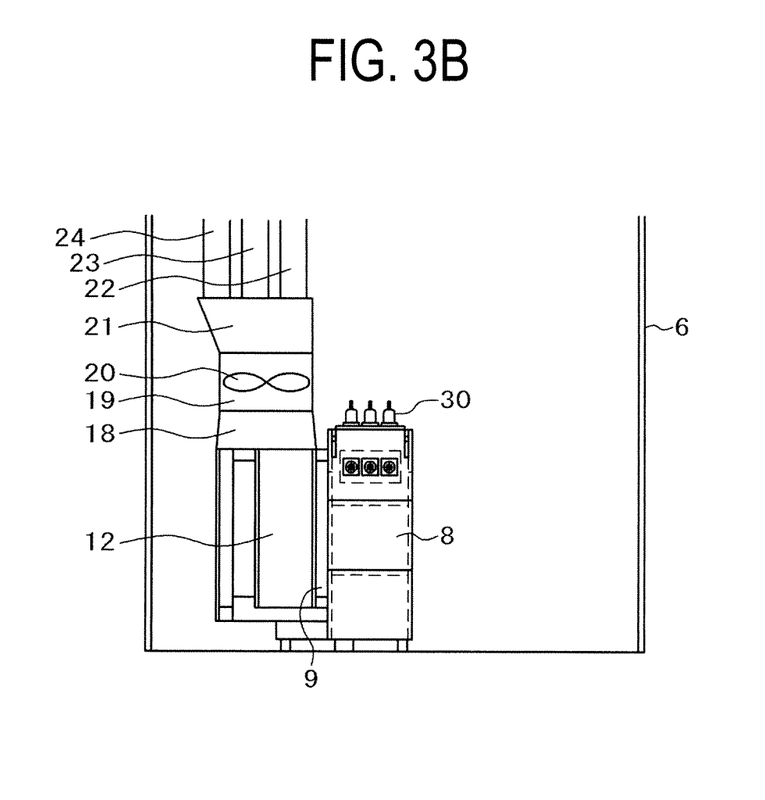
FIG. 3B illustrates a side view of the lower part in the tower where the stationary equipment according to one embodiment of the present invention is installed.

FIG. 3A and FIG. 3B partially illustrate the stationary equipment according to one embodiment of the present invention which is disposed in the tower 6. FIG. 3A is a top view thereof and FIG. 3B is a side view thereof.

In FIG. 3A and FIG. 3B, the stationary equipment 8 includes a main body part which contains an iron core, a coil and insulating oil and a cooling unit which is connected to the main body part to cool the insulating oil. A primary side terminal 30 and a secondary side terminal 31 are disposed in the main body of the stationary equipment 8. The primary side terminal 30 is a terminal which is connected to an inverter to convert wind-generated DC power to AC power and the secondary side terminal 31 is a terminal which is connected to a load side to which the power is supplied.

The insulating oil cooling unit is configured such that pipes 9, 10 and 11 (called pipes because they are passages of the insulating oil) are disposed to be connected to the main body of the stationary equipment 8 to circulate the insulating oil in the equipment through the pipes, corrugated fins 12 to 17 are formed on respective both sides of the pipes 9, 10 and 11 so as to circulate the insulating oil such that it passes through within the corrugated fins and then returns to the main body of the stationary equipment 8 through the pipes so as to cool air by making it flow through the corrugated fins 12 to 17 as illustrated in FIG. 3A.

A structure of the cooling unit will be described with reference to FIG. 9.

Figure 9:
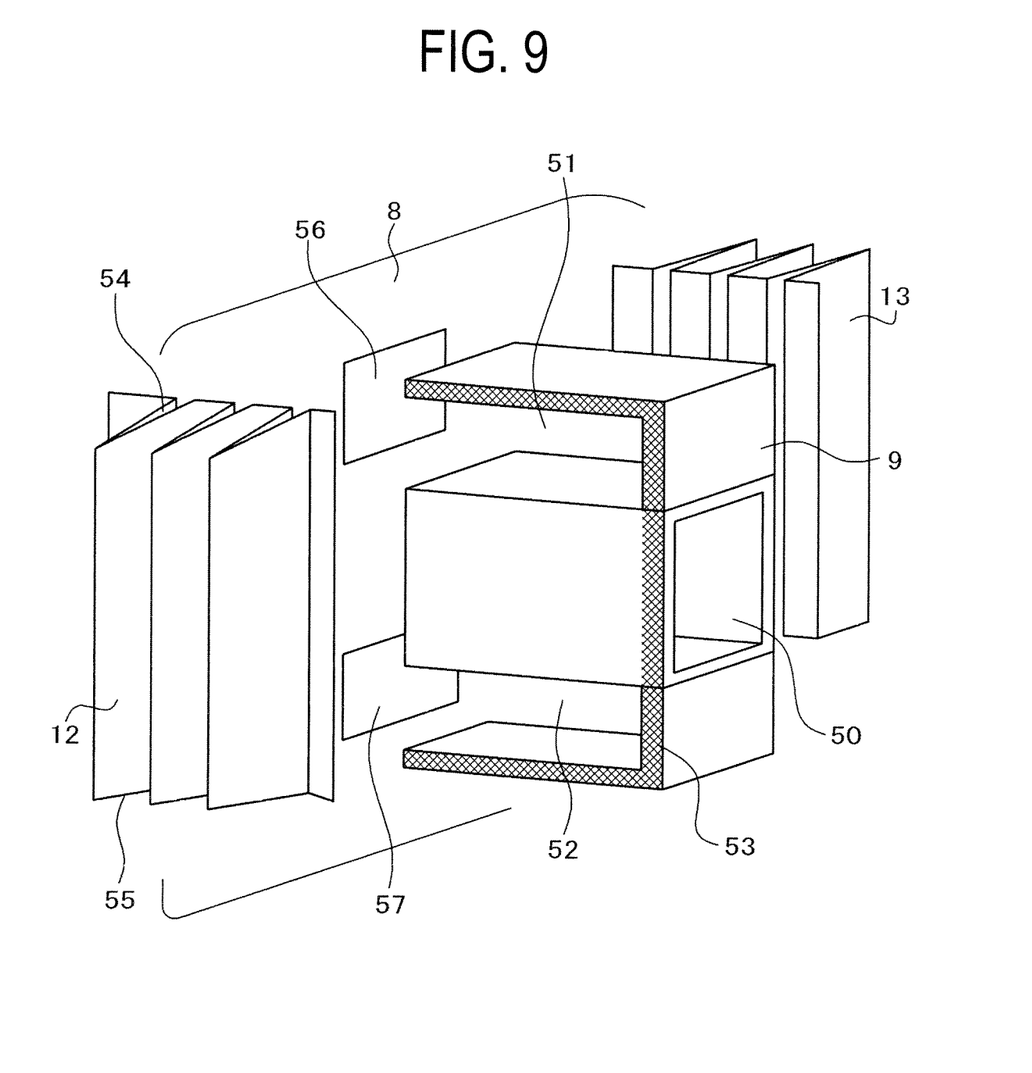
FIG. 9 is a perspective view illustrating a structure of a cooling unit of stationary equipment.

FIG. 9 is a schematic diagram illustrating one cooling unit included in the stationary equipment.

In FIG. 9, a hole 56 through which insulating oil is fed out and a hole 57 through which the insulating oil is received are formed in the main body of the stationary equipment 8. The pipe 9 which is an insulating oil passage connected to these two holes 56 and 57 is configured that L-shaped sheet materials are disposed to form spaces 51 and 52 on and under a square-pole-shaped hollow body 50. Then, the corrugated fins 12 and 13 are fixed to shaded parts 52 on the both sides of the pipe 9, for example, by welding. For example, the corrugated fin 12 is formed by folding a rectangular sheet material into a corrugated form and end surfaces 54 and 55 thereof are closed, for example, by welding. The corrugated fins 12 and 13 so formed are fixed to the pipe 9 from the both sides.

In a cooling structure as mentioned above, the insulating oil circulates such that it flows into the stationary equipment main body through its upper hole 56, flows downward in the plurality of corrugated fins through the space 51 in the pipe 9 and returns to the main body through the lower hole 57 in the main body of the stationary equipment 8 passing through the lower space 52 in the pipe 9. FIG. 3A illustrates a state that the structure illustrated in FIG. 9 is disposed on three places.

In FIG. 3B, 18 is a hood that covers the surrounding of corrugated fins for cooling. The lower side of the hood 18 is on a level with the lower side of each of the corrugated fins 12 to 17 so as to leave a space through which air may be taken into the hood from below.

The upper side of the hood 18 is narrowed at a part positioned higher than the corrugated fin 12 to have a square pyramid form and is connected to a duct 19.

A fan 20 is disposed in the dust 19 such that air flows upward from below (the cooling unit side) with rotation of the fan.

The duct 19 is connected to a duct 21 so as to be connected to the cylindrical member 22 disposed on the wall surface in the tower 8.

In FIG. 3A, 22 to 27 are cylindrical members. The cylindrical members 22 to 27 are elongated tubular members vertically disposed along the inner wall of the tower 6 and air which has been warmed by the corrugated fins or cooling fins goes upward through within the cylindrical members. Since a temperature of the air within the cylindrical members is higher than that of air surrounding the cylindrical members, the air is more liable to go upward by stack effect. Therefore, the air flows through the corrugated fins smoothly and hence the cooling efficiency may be increased.

An octagon 32 indicates a base on which the above mentioned PCS is to be mounted. Since, in general, the PCS is mounted on the upper side of the stationary equipment or the like, it is desirable to install the cylindrical members away from the base.

FIG. 3B illustrates a side view of the lower part in the tower illustrated in FIG. 3A.

In FIG. 3B, the hood 18 that covers the surrounding of the corrugated fins 12 to 17 (only the corrugated fin 12 is illustrated in FIG. 13B) of the cooling unit connected to the stationary equipment 8 is extended upward beyond the corrugated fins and is connected to the duct 19. The fan 20 is disposed in the duct 19. The duct 19 is connected to the duct 21 so as to be connected to the cylindrical member 22.

Next, a configuration of a cylindrical member will be described with reference to FIG. 4 and FIG. 5.

Figure 5:
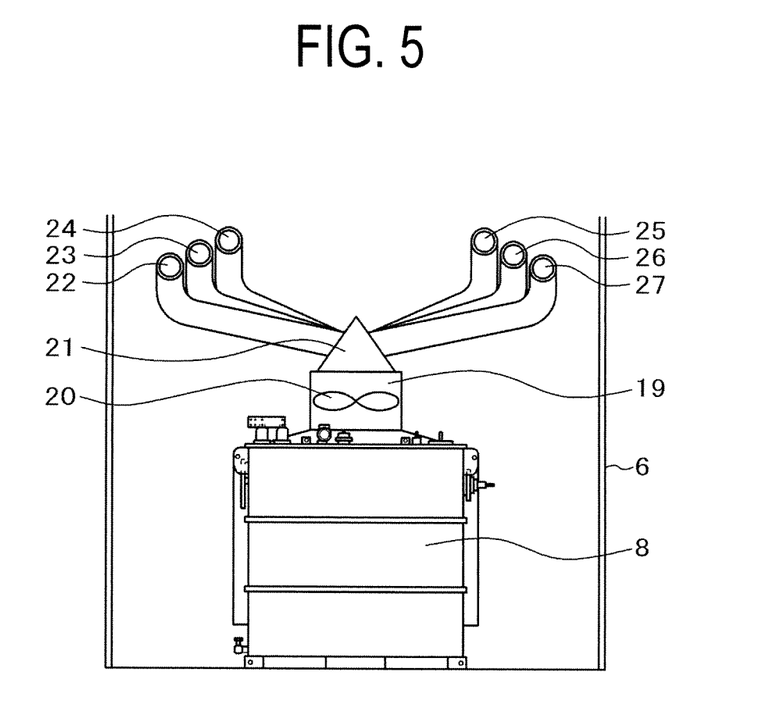
FIG. 5 illustrates a front view of the lower part in the tower of the present invention.

In FIG. 4 and FIG. 5, the cylindrical members 22 to 27 are connected to the duct 21. The duct 21 has a triangular prism form on which the cylindrical members are formed such that air readily goes upward through three parts in each of upper two surfaces of the duct 21. Each cylindrical member is bent along the inner wall of the tower 6. Although the cylindrical members 22 to 27 illustrated in the drawings are circular in section, they may be square or triangular in section.

In addition, although the hood 18 is connected to the dust 19 and then the duct 19 is connected to two sets of three cylindrical members via the triangular prism duct 21 in the embodiment, the duct 19 in which the fan 20 is disposed may be directly connected to one cylindrical which is almost circular, elliptical or square in section. In the above mentioned case, these cylindrical members are elongated to have the stack effect.

Next, the hood 18 will be described with reference to FIG. 6A and FIG. 6B.

Figure 6A:
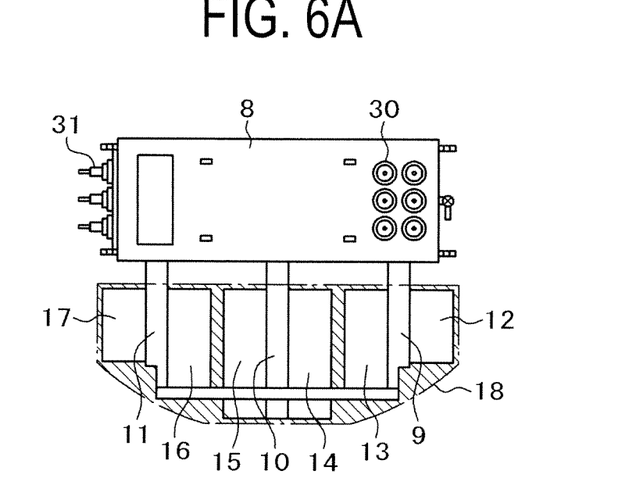
FIG. 6A illustrates a top view of the stationary equipment according to one embodiment of the present invention.
Figure 6B:
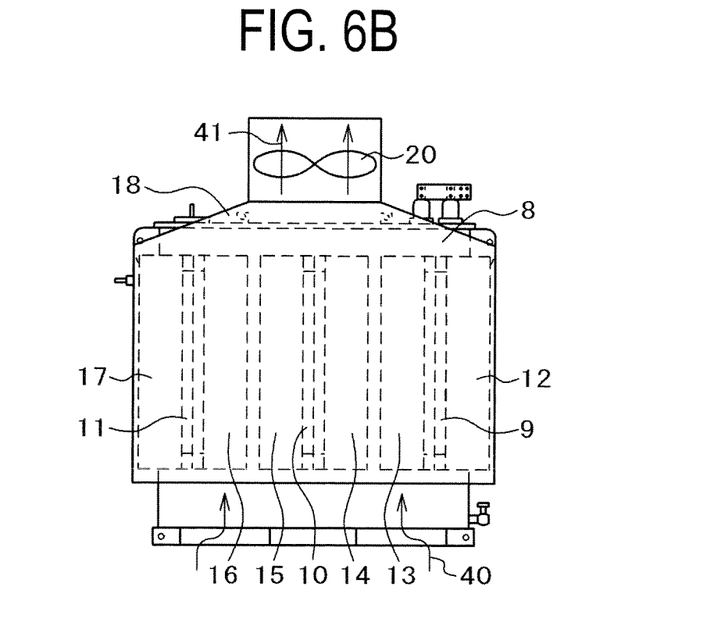
FIG. 6B illustrates a front view of the stationary equipment according to one embodiment of the present invention.

FIG. 6A and FIG. 6B illustrate a configuration that all the pipes 9, 10 and 11 extending from the stationary equipment main body and the corrugated fins 12 to 17 are covered with the hood 18.

The lower side of the hood 18 is opened such that air 40 is readily taken into the hood 19. In a configuration as mentioned above, air 41 flows upward in the duct 19.

An upper part of the hood 18 is tapered and narrowed starting from a position which is on a level with the corrugated fins and is then connected to the duct 19. That is, the duct is configured such that its sectional area is gradually reduced in a direction that air for cooling goes upward.

Since it is desirable to make a space for an operator and a manager in addition to a space where the stationary equipment is to be installed, the stationary equipment is disposed not on its central part but on its end as illustrated in FIG. 3A in many cases. Therefore, it is desirable to adjust the length of each corrugated fin of the stationary equipment so as to conform to the arched form of the tower. Next, a configuration so length-adjusted will be described.

In FIG. 6A, although the pipe 10 and the corrugated fins 14 and 15 which are disposed on central parts of the cooling unit of the stationary equipment are not influenced by the inner wall of the tower, the pipes 9 and 11 and the corrugated fins 12, 13, 16 and 17 which are disposed on the both sides are influenced by the inner wall. Therefore, the pipes 9 and 11 are made shorter than the central pipe 10 in a radius direction of the tower and the corrugated fins 12, 13, 16 and 17 are also made shorter than the corrugated fins 14 and 15 in the radius direction of the tower. In addition, the corrugated fins 12 and 17 on the both sides are made shorter the corrugated fins 13 and 16 so as to confirm to the arched form of the tower.

Figure 7:
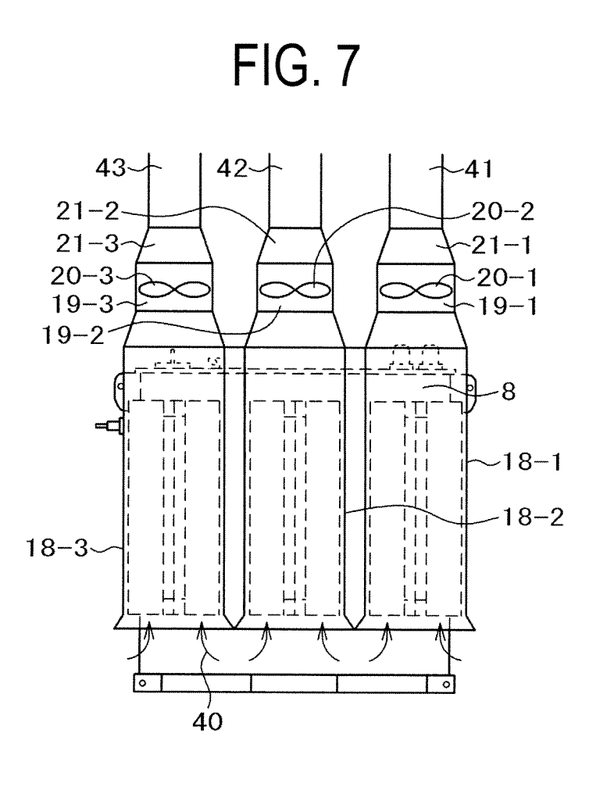
FIG. 7 is a diagram illustrating stationary equipment according to another embodiment of the present invention.

FIG. 7 is a side view illustrating a case that each hood 18 covers each protrusion and each corrugated fin.

In FIG. 7, each of hoods 18-1, 18-2 and 18-3 is tapered from a position which is on a level with each corrugated fin and is connected to each of upper ducts 19-1, 19-2 and 19-3 so as to allow air 40 sucked into the hood from its lower side to flow upward along each corrugated fin.

Fans 20-1, 20-2 and 20-3 are disposed in the ducts 19-1, 19-2 and 19-3 connected to the hood 18 so as to forcibly feed air upward from below.

Then, the ducts 19-1, 19-2 and 19-3 are connected to ducts 21-1, 21-2 and 21-3 so as to be connected to cylindrical members 41 to 43. The ducts 21-1, 21-2 and 21-3 are tapered to reduce sectional areas to be connected to the cylindrical members 41 to 43.

The cylindrical members 41 to 43 are elongated tubular members which are longitudinally formed on the inner wall surface of the tower 6.

In addition, in FIG. 7, the lower side of the hood is expanded like a skirt so as to readily take air into it.

Figure 8:
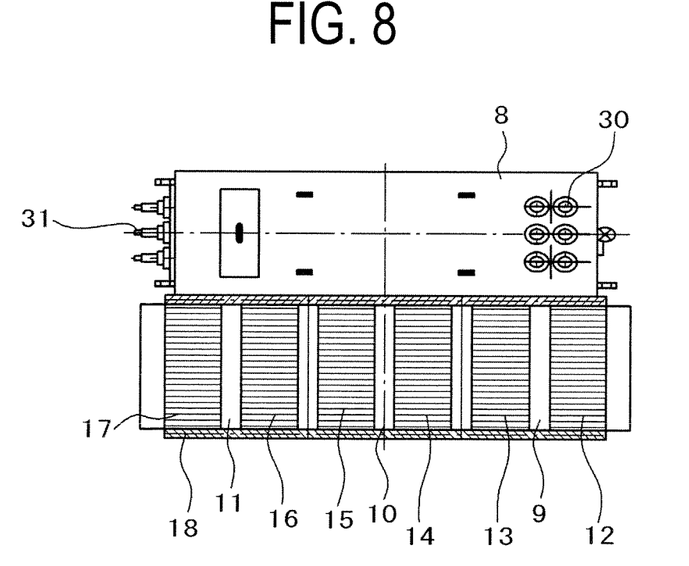
FIG. 8 is a diagram illustrating a state that a hood is put on corrugated fins when lengths of the corrugated fins of stationary equipment are made the same as one another.

FIG. 8 is a diagram illustrating a case that corrugated fins of stationary equipment are disposed without changing their lengths and forms and all the corrugated fins are covered with the hood 18 when a spatial margin is left in the tower.

The duct 19 is disposed on an upper part of the hood 18 and is connected to cylindrical members as in the case illustrated in FIG. 6B such that air passing through the corrugated fins is collected in the hood 18 and is forcibly fed to the cylindrical members by the fan 20 disposed in the duct 19, and the air warmed by the stack effect in the cylindrical members goes upward, whereby the stationary equipment may be cooled more efficiently.

Next, a configuration in which the boards or the heat insulation cloths are disposed between respective corrugated fins will be described with reference to FIG. 10A to FIG. 10C.

Figure 10A:
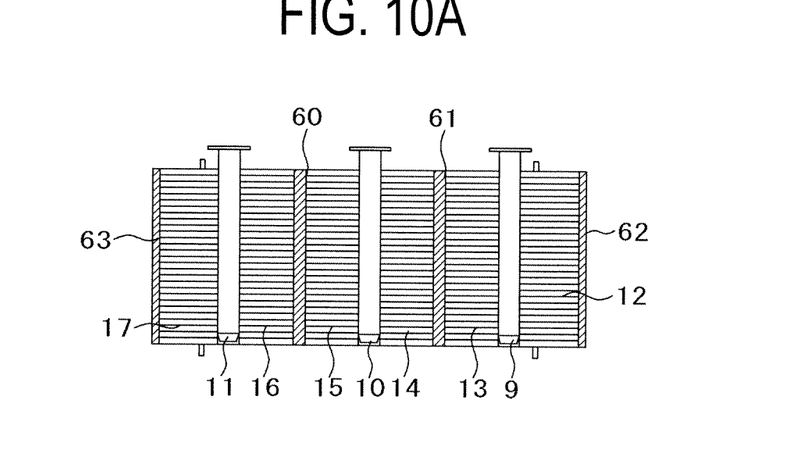
FIG. 10A is a top view illustrating a configuration of a cooling unit of stationary equipment in which a boards or a heat insulation cloths are disposed between respective corrugated fins.
Figure 10B:
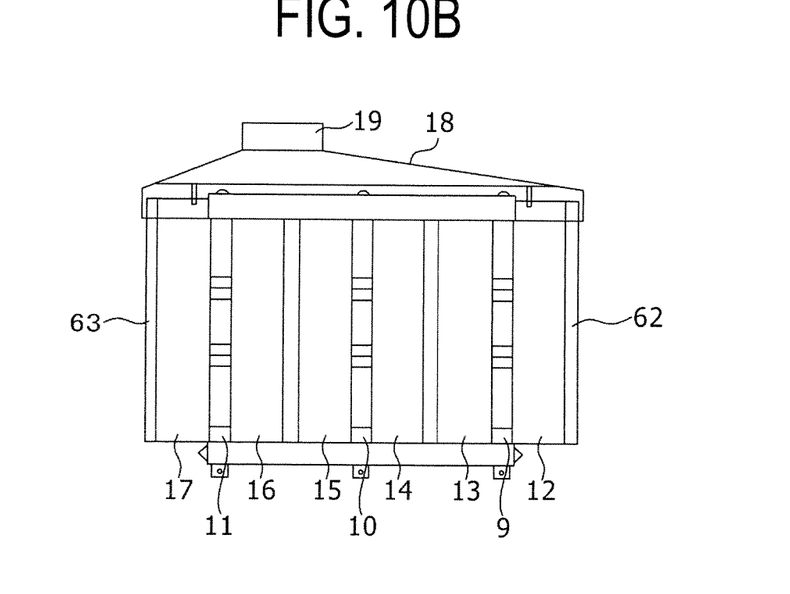
FIG. 10B is a front view illustrating the configuration of the cooling unit of the stationary equipment in which the boards or the heat insulation cloths are disposed between the respective corrugated fins.
Figure 10C:
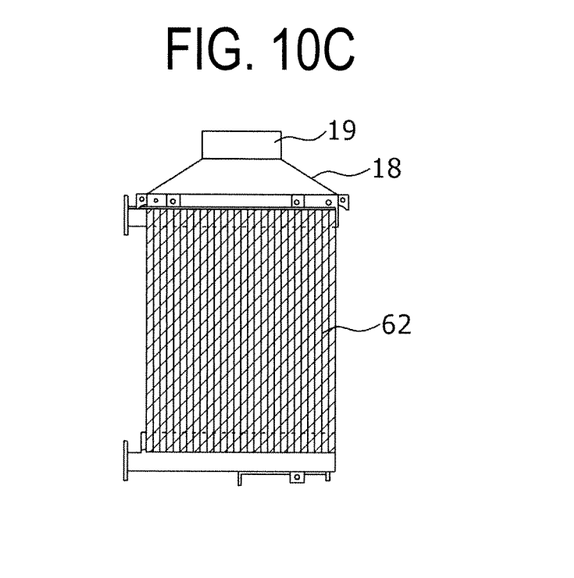
FIG. 10C is a side view illustrating the configuration of the cooling unit of the stationary equipment in which the boards or the heat insulation cloths are disposed between the respective corrugated fins.

FIG. 10 A is a top view illustrating a cooling unit of stationary equipment, FIG. 10B is a front view of the cooling unit, and FIG. 10C is a side view of the cooling unit.

In FIG. 10A, 12 to 17 are the corrugated fins and 9 to 11 are the pipes onto which the corrugated fins are attached and fixed. The board or the heat insulation cloth 61 is disposed and installed between the corrugated fins 12 and 13 attached to the both sides of the pipe 9 and the corrugated fins 14 and 15 attached to the both sides of the pipe 10. The board or the heat insulation cloth is made of insulating paper or cloth.

In addition, the board or the heat insulation cloth 60 is disposed and installed between the corrugated fins 14 and 15 attached to the both sides of the pipe 10 and the corrugated fins 16 and 17 attached to the both sides of the pipe 11.

Further, boards or heat insulation cloths 62 and 63 are disposed and installed on the both sides of the cooling unit of the stationary equipment as illustrated in FIG. 10A and FIG. 10B. FIG. 10 C is a diagram illustrating a state that the board or the heat insulation cloth 62 is installed on one side of the cooling unit of the stationary equipment over the entire surface of the one side.

Since the boards or the heat insulation cloths are disposed and installed between the adjacent corrugated fins and on the both sides of the cooling unit of the stationary equipment so as to isolate the corrugated fins from one another, air that flows along one corrugated fin flows only upward without flowing toward a neighboring corrugated fin. Thus, air resistance is reduced to facilitate going-up of wormed-up.

Therefore, such an effect is obtained that the cooling efficiency of the corrugated fins is increased.

The hood 18 of the configuration illustrated in FIG. 10B will be described by illustrating it again in FIG. 11.

Figure 11:
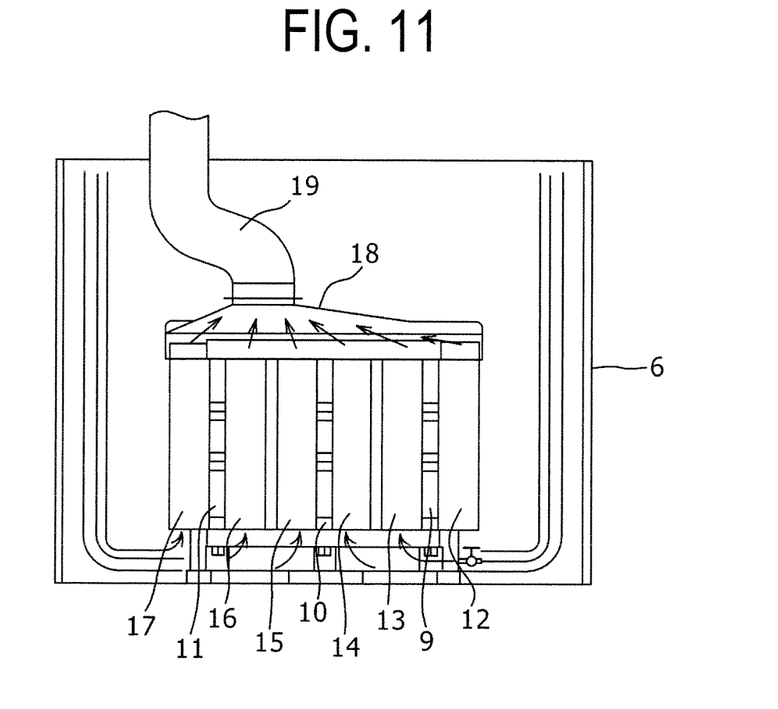
FIG. 11 is a diagram illustrating one hood configuration for the corrugated fins of the cooling unit of the stationary equipment illustrated in FIG. 10A to FIG. 10C.

FIG. 11 is a front view illustrating the cooling unit of the stationary equipment disposed on a lower part in the tower 6. In FIG. 11, the hood 18 disposed above the corrugated fins 12 to 17 is tapered such that air passing through the corrugated fins that are isolated from one another with the boards or the heat insulation cloths is collected in the lump directly above the corrugated fins and is fed into the duct 19. The duct 19 is connected to the hood 18 not at a position in the vicinity of the center of the hood 18 but at a sideward shifted position.

In a configuration as mentioned above, in the tower, air flows downward along the wall surface of the tower and enters again the corrugated fins from the lower side of the stationary equipment, is cooled and is circulated in the tower.

Figure 12:
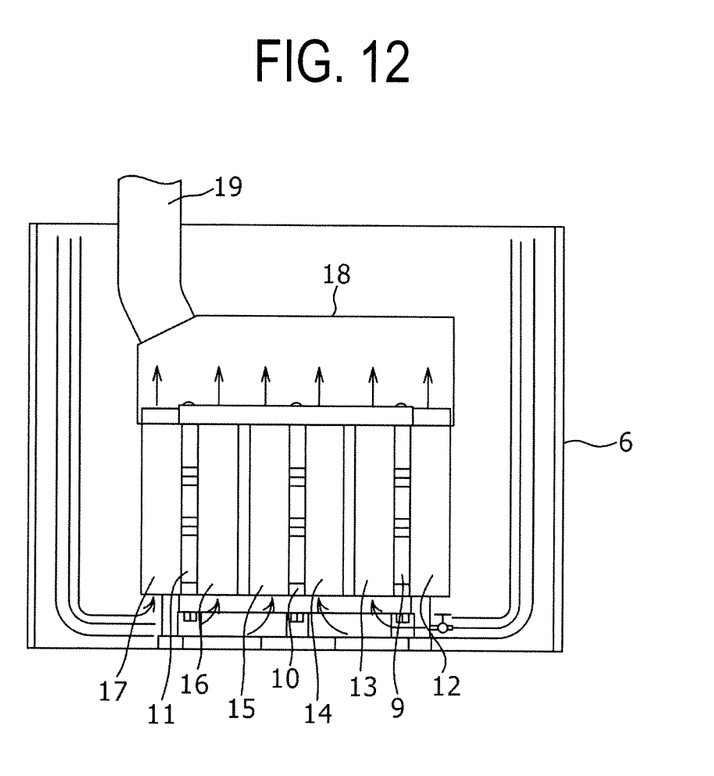
FIG. 12 is a diagram illustrating another hood configuration for the corrugated fins of the cooling unit of the stationary equipment illustrated in FIG. 10A to FIG. 10C.

FIG. 12 is a front view of a cooling unit of stationary equipment, illustrating an altered embodiment of the hood 18.

Although the hood 18 illustrated in FIG. 12 is disposed above the corrugated fins 12 to 17 as in the case in FIG. 11, the hood 18 in FIG. 12 has a configuration that a square space is formed in it unlike the configuration in FIG. 11. The hood 18 is also configured such that it is connected to the duct 19 at its sideward shifted position to collect air sent from the corrugated fins in the square space and to feed the collected air to a cylindrical member like the hood in FIG. 11.

As described above, since the duct according to the present invention is connected to the elongated cylindrical members, warm air passing through the corrugated fins readily goes upward in the cylindrical members by the stack effect and hence the cooling efficient may be increased even in a sealed space.

What is claimed is:

1. In stationary equipment used in a wind power generation device including a windmill, a tower, a nacelle and a generator to convert DC power generated by the generator to AC power to step up and step down a voltage, the stationary equipment comprising:
an equipment main body containing an iron core, a coil and insulating oil;
a hollow pipe connected to the equipment main body to circulate the insulating oil in it; and
a plurality of hollow corrugated fins disposed on the pipe,
wherein, the pipe and the corrugated fins are covered with a hood, and
a duct is connected to the hood and the duct is connected to a cylindrical member vertically disposed on an inner wall of the tower.

2. The stationary equipment according to claim 1, wherein a fan is disposed in the duct which is connected to the hood.

3. The stationary equipment according to claim 1, wherein a plurality of the hollow pipes connected to the equipment main body are disposed,
the plurality of hollow corrugated fins are disposed on each of the plurality of pipes, and
all the pipes and corrugated fins are covered with the hood, or each of the pipes and corrugated fins is covered with the hood.

4. In stationary equipment used in a wind power generation device including a windmill, a tower, a nacelle and a generator to convert DC power generated by the generator to AC power to step up and step down a voltage, the stationary equipment comprising:
an equipment main body containing an iron core, a coil and insulating oil;
a hollow pipe connected to the equipment main body to circulate the insulating air in it; and
a plurality of hollow corrugated fins disposed on the pipe,
wherein, boards or heat insulation cloths are disposed between adjacent corrugated fins disposed on the pipe and on the both sides of the corrugated fins,
the corrugated fins are covered with a hood, and
a duct is connected to the hood and the duct is connected to a cylindrical member that is vertically disposed on an inner wall of the tower.

5. The stationary equipment according to claim 4, wherein the hood that covers the corrugated fins includes a tapered or square space and is disposed above the corrugated fins.

6. The stationary equipment according to claim 5, wherein the hood that covers the corrugated fins is connected to the duct at a sideward shifted position.

* * * * *